United States Patent
Guyetant et al.

(10) Patent No.: US 12,307,189 B2
(45) Date of Patent: May 20, 2025

(54) COMPLETING TYPESET CHARACTERS USING HANDWRITTEN STROKES

(71) Applicant: MyScript, Nantes (FR)

(72) Inventors: Stéphane Guyetant, Nantes (FR); Zsolt Wimmer, Nantes (FR); Alain Chateigner, Nantes (FR)

(73) Assignee: MyScript, Nantes (FR)

( * ) Notice: Subject to any disclaimer, the term of this patent is extended or adjusted under 35 U.S.C. 154(b) by 131 days.

(21) Appl. No.: 18/272,294

(22) PCT Filed: Jan. 13, 2022

(86) PCT No.: PCT/EP2022/050616
§ 371 (c)(1),
(2) Date: Jul. 13, 2023

(87) PCT Pub. No.: WO2022/152782
PCT Pub. Date: Jul. 21, 2022

(65) Prior Publication Data
US 2024/0078377 A1 Mar. 7, 2024

(30) Foreign Application Priority Data
Jan. 14, 2021 (EP) .................................. 21305042

(51) Int. Cl.
*G06F 3/04883* (2022.01)
*G06F 40/109* (2020.01)
(Continued)

(52) U.S. Cl.
CPC ........ *G06F 40/171* (2020.01); *G06F 3/04883* (2013.01); *G06F 40/109* (2020.01); *G06V 30/2276* (2022.01)

(58) Field of Classification Search
CPC ........... G01N 21/00; B05C 11/02; B05C 3/00; B05C 3/18; B05C 5/02; G06F 3/00;
(Continued)

(56) References Cited

U.S. PATENT DOCUMENTS 9,965,175 B2   5/2018  Rucine et al.
2012/0254786 A1  10/2012  Colley

FOREIGN PATENT DOCUMENTS

EP   2506122 A2   10/2012
EP   1836651 B1   2/2018

OTHER PUBLICATIONS

EPO/RO—International Search Report and Written Opinion for related International Application No. PCT/EP2022/050616, mailed Jul. 1, 2022, 14 pgs.
(Continued)

*Primary Examiner* — Rayeez R Chowdhury
(74) *Attorney, Agent, or Firm* — McDermott Will & Emery LLP

(57) ABSTRACT

A system and method for completing a character of a text of a digital document on a computing device, the computing device comprising a processor, a memory, and at least one non-transitory computer readable medium for recognizing input under control of the processor, the at least one non-transitory computer readable medium is configured to cause display (S900) of at least one typeset character of the text on a display interface of the computing device; detect a handwritten input stroke (S902) performed on the digital document in the vicinity of a typeset character; identify an first typeset character (S904) if the typeset character belongs to a list of base characters according to a language model; retrieve a predefined character version (S906) of the first typeset character from the memory; generate a hybrid character (S908) by replacing the initial typeset character by the predefined character; generate a list of character candidates
(Continued)

(S910) with associated probabilities of recognition of the hybrid character provided by a recognition expert; select a recognized character (S912) from the character candidate list by using a language expert.

16 Claims, 7 Drawing Sheets

(51) Int. Cl.
*G06F 40/171* (2020.01)
*G06V 30/226* (2022.01)

(58) Field of Classification Search
CPC ... G06F 3/01; G06F 3/02; G06F 3/033; G06F 3/0482; G06F 3/0488; G06F 3/04883; G06F 40/109; G06F 40/171; G06F 3/048; G06F 7/00; G06T 11/00; G06T 17/00
See application file for complete search history.

(56) References Cited

OTHER PUBLICATIONS

De Cao Tran, et al., "An Efficient Method for On-line Vietnamese Handwritten Character Recognition" SoICT '12: Proceedings of the 3rd Symposium on Information and Communication Technology—Aug. 2012; pp. 135-141.

De Cao Tran, et al., "Accented Handwritten Character Recognition Using SVM-Application to French" Frontiers In Handwriting Recognition (ICFHR), 2010 Int'l. Conf. on IEEE, Piscataway, NJ, USA, Nov. 16, 2010 (Nov. 16, 2010), pp. 65-71.

Fadi Biadsy et al., "Segmentation-Free Online Arabic Handwriting Recognition", Int'l. Journal of Pattern Recognition and Artificial Intelligence (IJPRAI), World Sci Publ., SI, vol. 25, No. 7, Nov. 1, 2011 (Nov. 1, 2011), pp. 1009-1033.

FIG. 5A Le français peut être accentue.
502 504 505

FIG. 5B Le francais peut etre accentue.
512 514 515 500

FIG. 5C Le français peut ètre accentue.
522 24 524 525 25 500

FIG. 5D Le français peut être accentué.
22 532 534 535 530

FIG. 6A Where do you take handwritten notes? 600
610 □ at home
620 □ at work
630 □ at school

FIG. 6B Where do you take handwritten notes? 600
10 ☑ at home
□ at work
30 ☒ at school

FIG. 6C Where do you take handwritten notes? 650
660 ☑ at home
□ at work
680 ☒ at school

FIG. 7A Le français peut être accentué.
707　　　715 716　　　725 726

FIG. 7D Le français peut être accentûe.
FIG. 7E Le français peut être accentué.
FIG. 7F Le français peut'etre accentué.
FIG. 7G Le français peut être accentùe.

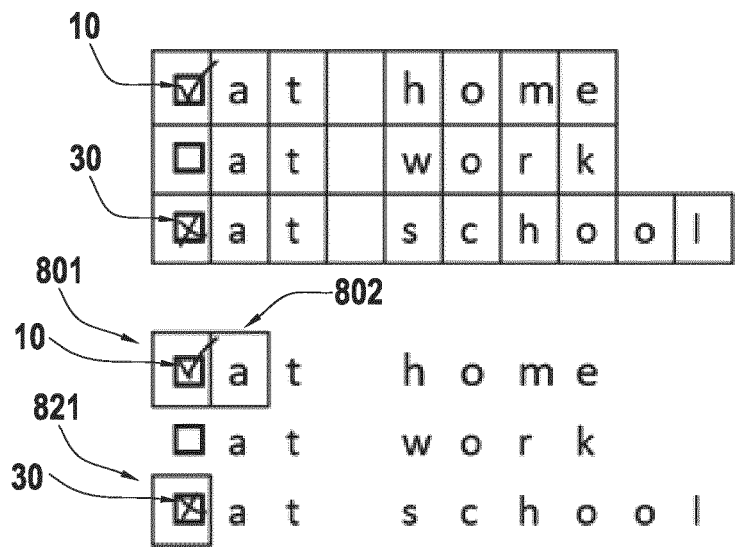

COMPLETING TYPESET CHARACTERS USING HANDWRITTEN STROKES

CROSS-REFERENCE TO RELATED APPLICATIONS

This application is a U.S. National Phase application under 35 U.S.C. § 371 of International Application No. PCT/EP2022/050616, filed on Jan. 13, 2022; which claims the benefit of priority to European Application No. 21305042.0, filed Jan. 14, 2021; both of which are incorporated herein by reference in their entirety for all purposes.

TECHNICAL FIELD

The present disclosure relates to the field of character recognition through handwriting recognition, and more particularly to the recognition of characters or symbols which may be associated with diacritical marks.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally comprise at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for drawing or inputting text. The user's handwriting is interpreted using a handwriting recognition system or method.

There are many applications of handwriting recognition in portable computing devices, such as smartphones, phablets and tablets, such as is in note taking, document annotation, mathematical equation input and calculation, music symbol input, sketching and drawing, etc. Handwriting may also be input to non-portable computing devices, particularly with the increasing availability of touchscreen monitors for desktop computers and interactive whiteboards. These types of input are usually performed by the user launching a handwriting input application on the computing device which accepts and interprets, either locally in the device or remotely via a communications link of the device, handwritten input on the touch sensitive surface and displays or otherwise renders this input as so-called 'digital ink'. Conventionally such handwriting input applications are limited in their capabilities to provide a full document creation experience to users from the text and non-text (e.g., drawings, equations), since the focus of these applications has primarily been recognition accuracy rather than document creation.

Computing devices can recognize text or non-text handwritten input. In the case of recognizing text input, available applications provide recognition of handwriting by handling standard character encodings, for example the Unicode encoding standard. Such character encodings maintain a standard character repertoire and allow handling of text expressed in most of the world's writing systems.

Each recognized input may be converted to be displayed as output text or non-text with digital equivalents of the handwritten content. Digital equivalents of handwritten characters are digital glyphs of letters or other symbols, known as typeset characters. In the case of recognized non-text input, digital equivalents of elements of drawings are the closest digital shapes or primitives (parts of shapes).

The digital equivalents are retrieved and ordered according to the digital content for visual display or rendering as fontified, typeset ink or typesetted version. The typeset version of the converted characters may be provided in the form of one or more fonts.

If the user desires any further interaction with the output text, such as editing the content, manipulating the layout of content, converting or adding the notes or other annotations into a document, or completing a text or an accentuated letter, the recognized handwriting content generally needs to be imported or otherwise integrated into a separate document processing application. This may be done automatically though the typesetting of the recognized handwriting into suitable typeset ink of suitable format or manually through redundant typing input of the handwriting, for example. The latter manual process is inherently counterproductive and is particularly performed when the perceived accuracy of the handwriting recognition is low, or the ability of the application to preserve the layout of the original handwriting is unreliable. The former automatic process itself does not present a great problem, however as the original layout of the handwriting and the actual input handwriting itself, the digital ink, is typically discarded in the import process, the user must refer back to the original handwriting in order to ascertain the original intent. For example, the user may have emphasized certain words or passages either by annotation or decoration, or through the layout of the content itself.

Some available digital handwriting applications provide the ability to edit the digital ink. However, this is generally done through the input of particular gestures for causing some sort of control, e.g., the launching of menus or running processes. The Applicant has found that when using handwriting applications users generally are unable or do not desire to learn specific gestures that are not natural or intuitive, or to make editing selections through menus and the like. Further, the requirement for particular learned methods to provide digital ink editing limits the usability of such applications, and digital handwriting more generally, as all users must learn the necessary behaviors for digital ink interaction.

In this context, a particular problem arises when diacritical marks are added to characters. A diacritical mark is a glyph or symbol added to a character that alters its meaning, function, or pronunciation. It is also known as a diacritic or an accent. Diacritical marks take such forms as a straight or curvy line, a dot or a pair of dots, added or attached to a character to indicate appropriate stress, special pronunciation, or unusual sounds. They are an integral part of spelling in many languages. Diacritical marks are used in dozens of languages and alphabetic systems, including Afrikaans, Arabic, Hebrew, Filipino, Finnish, Greek, Galician, Indi, Irish, Italian, Spanish, Vietnamese and Welsh.

There are many languages in the world that use the Latin alphabet, English, however, is one of the very few among them for which the standard spelling makes use of just the basic set of Latin alphabet. For example, different European languages have extended the available set of 26 letters by adding a distinguishing mark, (for example a diacritic) to an existing letter or a base character, so creating a different character such as an accentuated letter or a combined character.

Diacritics added to a character (or letter) change the meaning and/or the pronunciation of certain characters, and without them, correct grammar and written communication may be degraded. Diacritics added or merged to an existing character have various functions. They create new distinctive unit of writing in the context of a particular writing system for example new compound glyphs (graphemes) that represent new phonemes characteristic for a particular language. For example, French language spelling includes accentuated letters for which a diacritical mark associated with a base letter may modify the phonetic value of the grapheme or differentiate a word from another homonym, therefore the diacritical signs are required for spelling correctly words of a language.

In the French language, the usual diacritical marks are the acute ( ′ ), acute accent can only be on a base letter E, the grave ) `), grave accent can be on a base letter A, E, O or U, the circumflex (( ˆ ) ), the circumflex accent can be on a base letter A, E, I, O or U, the diaeresis ( ″) can be on a base letter E, I or U, and the cedilla ( ˛) is only found on the base letter C. It is convenient to classify marks according to where they are placed relative to the base letter. Various diacritics can be placed above a letter, as seen in é, è, ê, through or below a base letter, as ø, ç.

Additionally, a ligature occurs where two or more graphemes or base letters are joined as a single glyph. An example is the character œ, as used in French, in which the letters o and e are joined.

Fundamentally, computers store letters and other characters by assigning a number to each one. Character encoding system assigns these numbers. In the Unicode norm, every symbol is a hexadecimal code of 4 figures: U+xxxx, diacritical marks are represented with their own separate codes, but also as several combinations. Combined characters can be decomposed into a combining character sequence in the form of a base or initial character combined with an additional mark such as an accent belonging to the "Combining Diacritical Mark" block and it can also be coded as a precomposed character.

Other known symbols can be composed with a similar approach. For example, a base or initial character, such as a triangle 'Δ' or a square '☐', combined or merged with an additional mark or character, such as an exclamation mark '!' or a tick-mark " ", can be considered as a combined or merged characters, those resulting symbols having a distinctive meaning in the context of a particular writing system, such as the so called "replacement character" '◈' or the so called "ballot box" with check '☑'. Emoticons are also commonly created with diacritical marks.

Therefore, a base or initial character is a first character, such as a letter or a symbol, which can be completed or combined with a mark, an additional character or symbol to form a second character, different from the first character, such as an accentuated letter or a composed character representing a different grapheme or symbolic meaning.

There is thus a need for processing text in a digital document in an efficient and reliable manner, in particular for performing character completion in such a text, i.e. to process text in digital ink form when one or more existing characters are completed by at least one additional handwritten stroke. In particular, efficient and reliable recognition is needed when editing is performed on typeset content, for instance when an existing typeset character is completed with one or more additional mark or symbol (such as diacritical marks, accents or any other suitable marks) entered in handwritten form. Processing of mixed-type text content, comprising typeset and handwritten characters need to be improved.

SUMMARY OF THE INVENTION

The examples of the present invention that are described herein below provide computing devices, methods and corresponding computer programs for processing text in a digital document, and in particular for performing character completion on text comprised in a digital document.

According to a particular aspect, the invention provides a computing device for performing character completion in a text of a digital document, comprising:
 a display interface configured to display at least one typeset character of the text; an input surface configured to detect a handwritten input stroke input on the digital document, in the vicinity of a first typeset character of said at least one typeset character; an identification module configured to identify the first typeset character as a base character capable of character completion if the first typeset character belongs to a predefined list of base characters according to a language model; a retrieving module configured to retrieve from pre-stored data, from a first memory, a predefined character version of the first typeset character different from the first typeset character; a generation module configured to generate a hybrid character by replacing the first typeset character by the predefined character version, said hybrid character being formed by a combination of the predefined character version and the handwritten input stroke; a recognition module configured to generate a list of at least one character candidate with associated probabilities of recognition of the hybrid character; and a language module configured to select a recognized combined character from the character candidate list based on the associated probabilities.

According to a particular embodiment, the detected handwritten input stroke is at least partially located within predefined boundaries of the first typeset character.

According to a particular embodiment, the predefined list of base characters defines, in the first memory, characters which are combined with at least one additional mark or character to form a combined character.

According to a particular embodiment, the additional mark is a diacritical mark and the combined characters are accentuated letters.

According to a particular embodiment, the computing device is configured to: first, cause display of a handwritten input text on the display interface of the computing device; store the handwritten input text in a second memory of the computing device; cause recognition of the handwritten input text to determine the at least one first typeset character;

wherein the predefined character version retrieved from the pre-stored data is a handwritten character of the handwritten input text.

According to a particular embodiment, the predefined character version retrieved from the pre-stored data is stored as a prototype.

According to a particular embodiment, the prototype is a handwritten character.

According to a particular embodiment, the hybrid character is generated by positioning the predefined character together with the handwritten input stroke according to geometrical constraints.

According to a particular embodiment, the hybrid character is generated by positioning a predefined character boundary adjacent to a handwritten input stroke boundary.

According to a particular embodiment, the computing device is configured to cause display of the recognized typeset character by replacing the first typeset character by the typeset recognized character.

In a particular embodiment, the invention may be implemented using software and/or hardware components. In this context, the term "module" can refer in this disclosure to a software component, as well as a hardware component or a plurality of software and/or hardware components.

The present invention also relates to a corresponding method, implemented by a computing device as defined above, to perform character completion. More particularly, the present invention provides a method comprising the steps of: causing display of at least one typeset character of the text on a display interface of the computing device; detecting a handwritten input stroke on the digital document, in the vicinity of a first typeset character of said at least one typeset character; identifying the first typeset character as a base character capable of character completion if the first typeset character belongs to a predefined list of base characters according to a language model; retrieving, from pre-stored data, from a first memory, a predefined character version of the first typeset character different from the first typeset character; generating a hybrid character by replacing the first typeset character by the predefined character version, said hybrid character being formed by a combination of the predefined character version and the handwritten input stroke; generating a list of character candidates with associated probabilities of recognition of the hybrid character; and selecting a recognized combined character from the at least one character candidate based on the associated probabilities The various embodiments defined above in connection with the computing device of the present invention apply in an analogous manner to the method, the computer program and the non-transitory computer readable medium of the present disclosure.

For each step of the method of the present invention as defined in the present disclosure, the computing device may comprise a corresponding module configured to perform said step, and vice versa.

According to a particular embodiment, the predefined list of base characters defines, in the first memory, characters combined with at least one additional mark or character to form a combined character.

According to a particular embodiment, the method further comprises: causing display of a handwritten input text on the display interface of the computing device; storing the handwritten input text in a second memory of the computing device; causing recognition of the handwritten input text including the at least one first typeset character; wherein the predefined character version retrieved from the pre-stored data is a handwritten character of the handwritten input text.

According to a particular embodiment, the hybrid character is generated by positioning the predefined character together with the handwritten input stroke according to geometrical constraints.

According to another aspect, the present inventions relates to a non-transitory computer readable medium having recorded thereon a computer readable program code (or computer program) including instructions for executing the steps of the method of the invention as defined in the present document.

The computer program of the invention can be expressed in any programming language, and can be in the form of source code, object code, or any intermediary code between source code and object code, such that in a partially-compiled form, for instance, or in any other appropriate form.

The invention also provides a computer program as mentioned above.

The non-transitory computer readable medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The non-transitory computer readable medium of the invention can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

In a particular embodiment, the invention relates to a non-transitory computer readable medium having a computer readable program code embodied therein, said computer readable program code being adapted to be executed to implement a method on a computing device as defined in the present document, the computing device comprising a processor for executing the steps of said method.

According to another aspect, the invention relates to a system performing character completion in a text of a digital document on a computing device, the computing device comprising a processor, at least one memory, and at least one non-transitory computer readable medium for recognizing input under control of the processor, the at least one non-transitory computer readable medium being configured to: display at least one typeset character of the text; detect a handwritten input stroke input on the digital document, in the vicinity of a first typeset character of said at least one typeset character; identify the first typeset character as a base character capable of character completion if the first typeset character belongs to a predefined list of base characters according to a language model; retrieve from pre-stored data a predefined character version of the first typeset character different from the first typeset character; generate a hybrid character by replacing the first typeset character by the predefined character version, said hybrid character being formed by a combination of the predefined character version and the handwritten input stroke; generate a list of at least one character candidate with associated probabilities of recognition of the hybrid character; and select a recognized combined character from the character candidate list based on the associated probabilities.

According to a particular embodiment, the at least one non-transitory computer readable medium is configured to: cause display of a handwritten input text on the display interface of the computing device; store the handwritten input text; cause recognition of the handwritten input text including the at least one first typeset character; wherein the predefined character version retrieved from the pre-stored data is a handwritten character of the handwritten input text.

According to a particular embodiment, the predefined character version retrieved from the pre-stored data is stored as a prototype, wherein the prototype is a handwritten character.

BRIEF DESCRIPTION OF THE DRAWINGS

The present system and method will be more fully understood from the following detailed description of the examples thereof, taken together with the drawings. In the drawings like reference numerals depict like elements. In the drawings:

FIG. 5.A shows example handwritten content input to an input area and rendered as digital ink on a computing device of the present invention;

FIG. 5.B shows the result of typesetting the handwritten content of FIG. 5.A, according to a particular embodiment of the present invention;

FIG. 5.C shows the content of FIG. 5.B with an example of handwritten strokes completing typeset characters, according to a particular embodiment of the present invention;

FIG. 5.D shows the content of FIG. 5.C with the result of typesetting the handwritten strokes of FIG. 6.A shows example typeset content representing a questionnaire to be answered, rendered as digital ink on a computing device of the present invention;

FIG. 6.B shows the content of FIG. 6.A with handwritten strokes representing answers to the questionnaire, according to a particular embodiment of the present invention;

FIG. 6.C shows the content of FIG. 6.B with the result of typesetting the handwritten strokes of FIG. 7.A shows the content of FIG. 5.C with a representation of a segmentation of typeset content, according to a particular embodiment of the present invention;

FIG. 7.B shows the representation of the segmentation boxes of typeset characters including the handwritten strokes of FIG. 5.C, according to a particular embodiment of the present invention;

FIG. 7.C shows the representation of the segmentation boxes of FIG. 7.B with prototype characters replacing the typeset characters, according to a particular embodiment of the present invention;

FIG. 7.D shows the content of FIG. 5.C with prototype characters replacing the typeset characters, according to a particular embodiment of the present invention;

FIG. 7.E shows possible recognition candidate result of the content of FIG. 7.D, according to a particular embodiment of the present invention;

FIG. 7.F shows possible recognition candidate result of the content of FIG. 7.D, according to a particular embodiment of the present invention;

FIG. 7.G shows possible recognition candidate result of the content of FIG. 7.D, according to a particular embodiment of the present invention;

FIG. 8.A shows three lines of the content of FIG. 6.A with a representation of a segmentation of typeset content, according to a particular embodiment of the present invention;

FIG. 8.B shows the representation of the segmentation boxes of typeset characters including the handwritten strokes of FIG. 8.A, according to a particular embodiment of the present invention;

FIG. 8.C shows possible recognition candidates result of the content of FIG. 7.D, according to a particular embodiment of the present invention;

FIG. 8.D shows possible recognition candidates result of the content of FIG. 7.D, according to a particular embodiment of the present invention;

Figure 1:
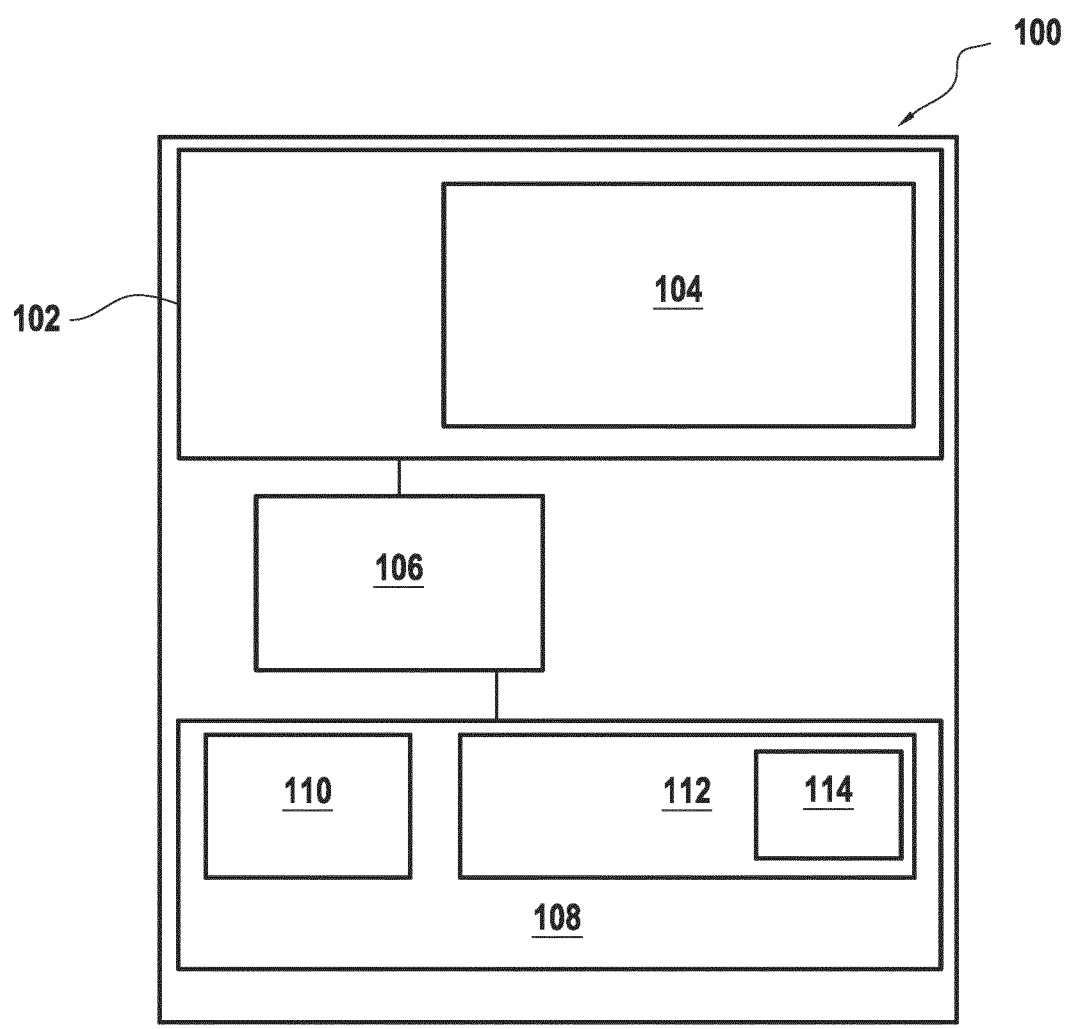
FIG. 1 shows a block diagram of a computing device in accordance with an embodiment of the present invention.

The components in the figures are not necessarily to scale, emphasis instead being placed upon illustrating the principles of the present invention.

For simplicity and clarity of illustration, the same reference signs will be used throughout the figures to refer to the same or analogous parts, unless indicated otherwise.

DESCRIPTION OF PARTICULAR EMBODIMENTS OF THE INVENTION

In the following detailed description, numerous specific details are set forth by way of examples in order to provide a thorough understanding of the relevant teachings. However, it should be apparent to those skilled in the art that the present teachings may be practiced without such details. In other instances, well known method, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a computing device, a corresponding method and a corresponding computer program are discussed.

The terms "hand-drawing" and "handwriting" are used interchangeably herein to define the creating of digital contents (handwriting input) by users through use of their hands (or fingers) or an input device (hand-held stylus or digital pen, mouse . . . ) on or with an input surface. The term "hand" or the like is used herein to provide concise description of the input techniques, however the use of other parts of a user's body for similar input is included in this definition, such as foot, mouth and eye.

The term "text" in the present disclosure is understood as encompassing all characters and the like (e.g. alphanumeric characters), and strings thereof, in any written language and, more generally, any symbols used in written text. Text thus includes for instance base characters and accents from any script, such as Latin scripts, Cyrillic scripts, Chinese scripts, and so on. Text may comprise one or a plurality of such symbols, and may be arranged in various manner such as in text lines, paragraph of multiple text lines, etc.

Furthermore, the examples described below and shown in the drawings are in a left-to-right written language context, and therefore any reference to positions can be adapted for written languages having different directional formats.

FIG. 1 shows a block diagram of a computing device 100 according to a particular embodiment of the present invention. The computing device 100 may be a computer desktop, laptop computer, tablet computer, hybrid computers (2-in-1s), e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element (a processor or the like), some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The computing device 100 comprises at least one display 102 for displaying data such as images, text, and video. The display (or screen) 102 may use LCD, plasma, LED, iOLED, CRT, or any other appropriate technology that is or is not touch sensitive as known to those of ordinary skill in the art.

The computing device 100 also comprises an input surface 104 for handwriting (or hand-drawing) text, characters, symbols or the like. The input surface 104 is suitable to detect strokes of digital ink entered by a user on (or using) the input surface 104. At least some of the display 102 may be co-located with the input surface 104. The input surface 104 may employ any appropriate technology such as resistive, surface acoustic wave, capacitive, infrared grid, infra-red acrylic projection, optical imaging, dispersive signal technology, acoustic pulse recognition, or any other appropriate technology as known to those of ordinary skill in the art to receive user input in the form of a touch- or proximity-sensitive surface. The input surface 104 may be a touch sensitive surface (or a touch sensitive screen) or it may be a non-touch sensitive surface (a non-touch sensitive screen) monitored by a position detection system. The input surface 104 may be bounded by a permanent or video-generated border that clearly identifies its boundaries. Instead of, or additional to, an on-board display, the computing device 100 may have a projected display capability.

The computing device 100 may include one or more additional I/O devices (or peripherals) that are communicatively coupled via a-local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

As shown in FIG. 1, the computing device 100 also includes a processor 106 and a memory 108.

The processor 106 is a hardware device for executing software, particularly software stored in the memory 108. The processor 106 can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 is (or comprises) a non-transitory (or non-volatile) computer readable medium (or recording medium). The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an ink management system (or ink manager) 112. The operating system 110 is configured to control the execution of the ink management system 112. The ink management system 112 constitutes (or comprises) a computer program (or computer-readable program code) according to a particular embodiment of the invention, this computer program comprising instructions to implement a method according to a particular embodiment of the invention.

The ink management system 112 optionally further includes a handwriting recognition (HWR) system 114 which may each include one or more separate computer programs. Each of these has an ordered listing of executable instructions for implementing logical functions. The operating system 110 controls the execution of the ink manager 112 (and the HWR system 114). The operating system 110 may be any proprietary operating system or a commercially or freely available operating system, such as WEBOS, WINDOWS®, MAC and IPHONE OS®, LINUX, and ANDROID. It is understood that other operating systems may also be utilized. Alternatively, the ink management system 112 of the present system and method may be provided without use of an operating system.

The ink manager 112 includes one or more processing elements (also called modules or processing modules) related to detection, management and treatment of user input (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The ink manager 112, and the other applications, include program(s) provided with the computing device 100 upon manufacture and may further include programs uploaded or downloaded into the computing device 100 after manufacture.

The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, Python, C#, Ruby, Rust, Go, Julia, Kotlin, Javascript, R and Ada; or (c) functional programing languages for example but no limited to Hope, Rex, Common Lisp, Scheme, Clojure, Racket, Erlang, OCaml, Haskell, Prolog, and F#.

Alternatively, the HWR system 114 may be a method or system for communication with a handwriting recognition system remote from the device, such as server or cloud-based system, but is remotely accessible by the computing device 100 through communications links using the aforementioned communications I/O devices of the computing device 100. In FIG. 1, the HWR system 114 is shown as being incorporated in the ink manager 112, however it is possible the HWR system 114 is separate from and connected to the ink manager 112 either within the computing device 100 or remotely. Further still, the ink manager 112 and/or the HWR system 114 may be integrated within the operating system 110.

Strokes entered on or via the input surface 104 are processed by the processor 106 as digital ink. Users may enter a stroke with a finger or some instrument such as a pen or stylus suitable for use with the input surface. The user may also enter a stroke by making a gesture above the input surface 104 if technology that senses or images motion in the vicinity of 'the input surface 104 is being used, or with a peripheral device of the computing device 100, such as a mouse or joystick, or with a projected interface, e.g., image processing of a passive plane surface to determine the stroke and gesture signals.

In the present document, a stroke is characterized by at least the stroke initiation location, the stroke termination location, and the path connecting the stroke initiation and termination locations. Further information such as timing, pressure, angle at a number of sample points along the path may also be captured to provide deeper detail of the strokes. Because different users may naturally write the same object, e.g., a letter, a shape, a symbol, with slight variations, the HWR system 114 accommodates a variety of ways in which each object may be entered whilst being recognized as the correct or intended object.

Figure 2:
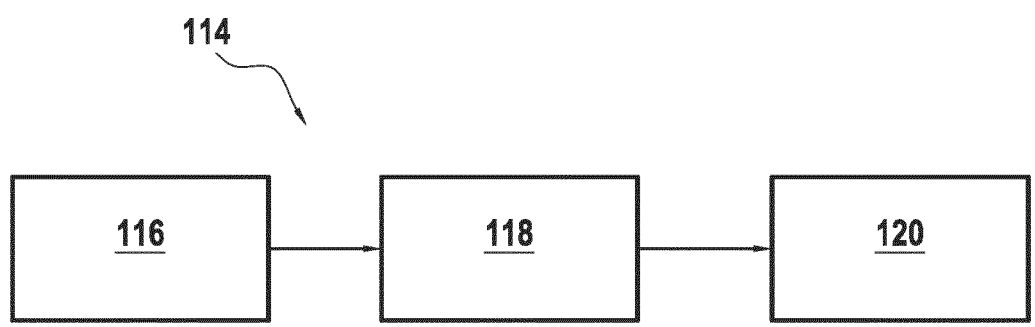
FIG. 2 shows a block diagram of a system for handwriting recognition in accordance with an embodiment of the present invention.

FIG. 2 is a schematic pictorial of an example of the HWR system 114, in either its local (i.e., loaded on the device 100) or remote (i.e., remotely accessible by the device 100) forms. The HWR system 114 includes stages (and corresponding modules) such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as β-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters.

Figure 3:
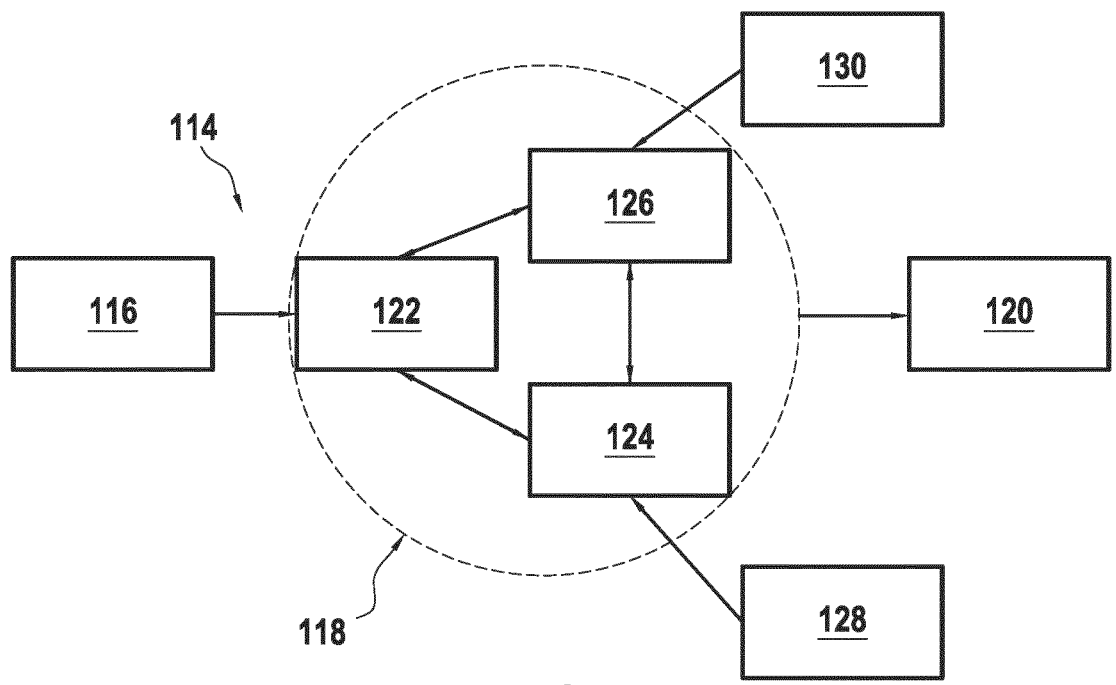
FIG. 3 shows a block diagram illustrating detail of the handwriting recognition system of FIG. 2 in accordance with an embodiment of the present invention.

The recognition stage 118 may include different processing elements or experts. FIG. 3 is a schematic pictorial of the example of FIG. 2 showing schematic detail of the recognition stage 118. Three expert systems (or modules), a segmentation expert system (or segmentation module) 122, a recognition expert system (or recognition module) 124, and a language expert system (or language module) 126, are illustrated which collaborate through dynamic programming to generate the output 120. An expert system is a computer system emulating the decision-making ability of a human expert. Expert systems are designed to solve complex problems by reasoning through bodies of knowledge, represented mainly as if-then rules rather than through conventional procedural programming.

Some aspects of these experts are described here below to facilitate understanding of the present invention. However, no further detail is provided to avoid unnecessarily obscuring the present disclosure. Details of implementing handwriting recognition can for instance be found in EP patent application No 1 836 651 B1.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph.

The recognition expert 124 associates a list of character candidates with probabilities or recognition scores for each node of the segmentation graph. These probabilities or recognition scores are based on language information 130. The language information defines all the different characters and symbols of the alphabet underlying to the specified language. This information is language dependent and comprises general differences in alphabets as well as the ability to recognize various individual and regional styles of writing the alphabets. For instance, the way an individual writes a "7" can be quite different depending on whether that individual is from the USA, France, or even Korea. The recognition expert 124 may include two stages. An optional stage of the recognition expert 124, feature extraction, is based on a combination of dynamic and static features. For instance, the dynamic features can be extracted from the trajectory of the input stroke and are based on information such as position, direction, and curvature of the input stroke. Static features can be extracted from a bitmap representation of the input stroke and can be based on projections and histograms. Then the recognition expert classifies the input or the extracted features. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task. The recognition expert 124 outputs a list of character candidates with probabilities or recognition scores for each node of the segmentation graph.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. and is the storage for all static data used by the language expert 126 to execute a language model. A language model can rely on statistical information on a given language. The linguistic information 130 is computed off-line, with or without adaption according to the results of recognition and user interactions and provided to the linguistic expert 126. The language expert 126 aims at finding the best recognition path. In one example, the language expert 126 does this by exploring a language model such as finite state automaton (FSA) representing the content of linguistic information 130. In addition to the lexicon constraint, the language expert 126 may use a language model with statistical information modeling for how frequent a given sequence of elements appears in the specified language or is used by a specific user to evaluate the linguistic likelihood of the interpretation of a given path of the segmentation graph.

The computing device 100 and corresponding method make use of the HWR system 114 in order to recognize handwritten input to the device 100. The ink management system 112 includes application(s) for handling the layout of the recognized user input. Such applications may be provided in an architecture with separate layers for handling different processing. One or more of these layers may be remote to the device 100 accessible via the communications channels mentioned earlier. The layers may include application wrapper(s), platform wrapper(s) and (platform specific) application user interface(s).

The ink management system 112 of the computing device 100 allows users to use natural writing to input content and to interact with the content to produce digital documents in sharable format on their portable or non-portable computing devices using natural and intuitive operations, such as gestures. Any person able to write is familiar with using handwriting to create and edit content. Any digital device user is already accustomed to gesturing on screen to write or edit content. Gesturing is a natural and intuitive pattern on touch and hover devices. These and other features of the present system and method are now described in detail.

Figure 4:
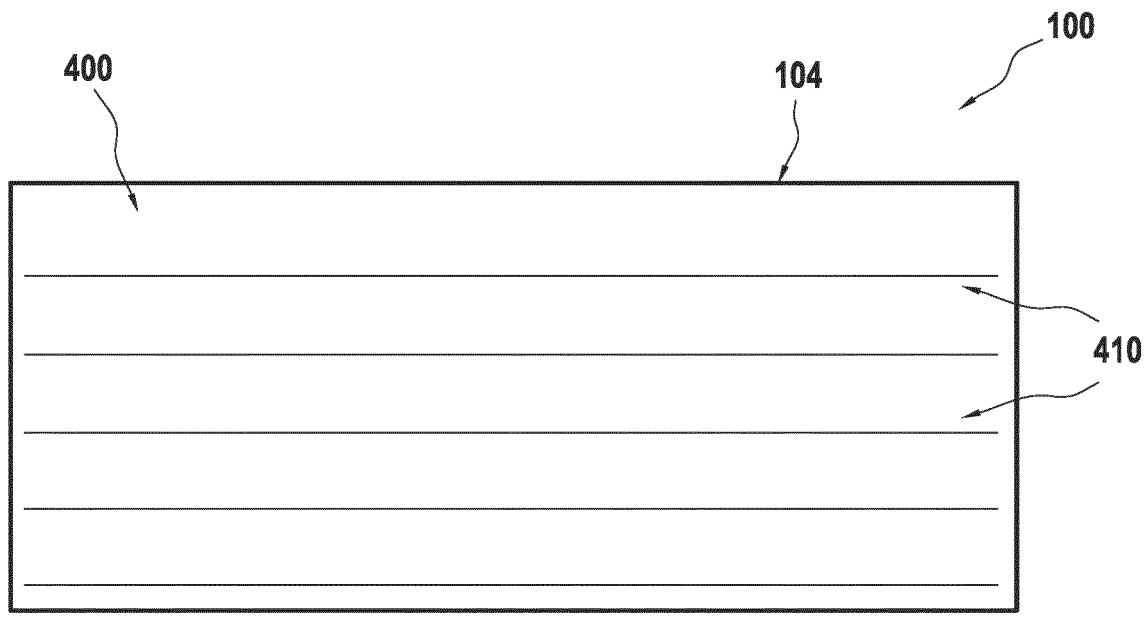
FIG. 4 shows a schematic view of an example visual rendering of an ink input area on a portion of an input surface of a computing device of the present invention.

FIG. 4 shows a schematic view of an example visual rendering of an digital ink input in a capture area 400 within the display 102 of the computing device 100. The input area 400 is provided as a constraint-free canvas that allows users to create object blocks (blocks of text, drawings, etc.) anywhere without worrying about sizing or alignment. However, as can be seen an alignment structure in the form of a line pattern background 410 can be provided for guidance of user input and the alignment of digital and typeset ink objects. In any case, as users may input handwriting that is not closely aligned to the line pattern, or may desire to ignore the line pattern and write in a unconstrained manner, such as diagonally or haphazardly, the recognition of the handwriting input is performed by the HWR system 114 without regard to the line pattern. An example alignment pattern is described in U.S. patent application Ser. No. 14/886,195 titled "System and Method of Digital Note Taking" filed in the name of the present Applicant and Assignee, the entire content of which is incorporated by reference herein.

The input of handwritten content onto the input area 400 is performed through the use of gestures in relation to the input surface 104, e.g., through touch, force and/or proximity depending on the screen technology of the device 100. Gesture detection may be handled differently depending on the ability of the computing device 100 to differentiate a users' finger from a stylus or pen (by which the device defines passive and active styli) or the ability of a stylus to indicate or communicate to the device that it is being used for handwriting or the ability of users to provide such an indication. By default, and in devices which do not differentiate, any single-point touch or hover event within the input area 400 is to be considered as content input or content interaction. The present system and method through the HWR system 114 also provide a mechanism to digitize or convert the handwritten input through the typesetting or fontification of the digital ink into typeset ink. This function is particularly provided to allow the creation of at least near-final documents for communication and sharing, e.g., conversion of a handwritten note which has been edited and formatted in digital ink into a typeset document which could have been produced using keyboard (and associated gesturing devices) alone.

The handwritten input is detected by the ink management system 112 and rendered as digital ink on the display 102 (or other display) as the input is received and is concurrently recognized by the HWR system 114 providing so-called 'on-the-fly' or incremental handwriting recognition. Incremental recognition is generally performed by parsing the (pre-processed) strokes to the recognizer as they are received and the recognizer processing groups of the strokes to output recognition results, even as input continues, where the results may be substantially immediately provided in the form of typesetting of the digital ink or displayed recognition candidates, or merely stored by the ink management system 112 for later use, e.g., by using the memory 108 of the device 100. Re-recognition may occur upon the input of further strokes that relate to earlier input strokes in a spatial manner, such as diacritics. Alternatively, or additionally, handwriting recognition may be performed as a batch process, rather than incrementally. In such an example, display of the digital ink and the typeset ink may occur during input at specified times, e.g., system and/or user specified, or may occur at a time after input on the same or different device, for example.

FIG. 5.A shows, on the display interface 102 of the computing device 100, one text line as handwritten input to the input area 400 on the lines of the line pattern 410 and rendered as digital ink. The digital ink includes several input strokes representing text characters or letters and distributed into five successive sequences of text characters aimed at being words of a phrase into the French language and inputted as "Le francais peut etre accentue.".

The second sequence of characters 502 consists of eight characters "francais" displayed as digital ink according to the handwritten input.

In the French language, the correct spelling of the word "francais" (meaning French) encloses, as a fifth letter, a combined character composed of a base character ⟨c⟩ associated with an additional cedilla mark to modify the phonetic value of the letter ⟨c⟩.

The fifth character of the second sequence 502 "francais" is displayed as a base character ⟨c⟩. Therefore, the fifth character ⟨c⟩ of the character sequence 502 "francais" is missing an additional mark in order to be considered as a French word correctly spelt as "français".

The additional mark of the fifth character is not entered: it may be an error, an omission, or an intended interruption or omission (for example in an educational context) for inputting the additional mark subsequently.

The fourth sequence of characters 504 "etre" consists of four characters displayed as digital ink according to the handwritten input strokes.

In the French language, the correct spelling of the word "être" (meaning "to be") comprises, as a first character, an accentuated letter composed of a base letter ⟨e⟩ associated with a circumflex accent, to modify the phonetic value of the letter ⟨e⟩.

The first character of the fourth sequence of characters 504 "etre" is displayed as a base letter ⟨e⟩. Therefore, the first letter ⟨e⟩ of the character sequence 504 "etre" is missing a circumflex accent to be considered as a French word correctly spelt as "être". As described earlier, the absence of the accent can be intended or not, depending on the context of the use.

The sequence of characters 505 "accentue" consists of eight characters displayed as digital ink according to the handwritten input strokes.

In the French language, the verb "accentuer" (meaning "to accentuate") is spelt differently depending on the grammatical context of the word: (i) the word "accentue" is a conjugated form of the verb "accentuer" wherein the last letter of the word "accentue" includes a letter (e), (ii) the word "accentué" is the past participle and adjective forms of the verb "accentuer" wherein the last letter of the word "accentué" includes an accentuated letter ⟨e⟩ with an acute accent modifying the phonetic value of the base letter ⟨e⟩ and therefore the grammatical form of the word.

The last character of the sequence of characters 505 "accentue" is displayed as a character ⟨e⟩ according to the handwritten input strokes.

From a French linguistic point of view, the digital ink of FIG. 5.A could only be interpreted as a meaningful phrase if the last word would include an accentuated letter ⟨e⟩ as last character. Therefore, a diacritical mark might be missing on the last letter of the fifth sequence of characters 505.

FIG. 5.B shows one input line as typeset content 500 displayed on the display 102 of the device. The typeset content is distributed into five successive sequences of typeset characters displayed as "Le francais peut etre accentue.".

In one example, the typeset content displayed on the display 102 is the result of handwriting recognition of the handwritten characters of FIG. 5.A. In particular, the typeset content 500 comprises the typeset words 512, 514 and 515 corresponding respectively to typeset versions of the handwritten words 502, 504 and 505 shown in FIG. 5.A.

When processing digital ink classified as text, the recognizer 118 may employ the segmentation expert 122 to segment individual strokes of the text to determine the segmentation graphs, the recognition expert 124 to assign probabilities to the graph nodes using the classifier 128, and the language expert 126 to find the best path through the graphs using, for example, a text-based lexicon of the linguistic information 130.

As shown in FIG. 5.B, the second sequence of characters "francais" 512 comprises eight typeset characters. The fifth character of the sequence 512 "francais" is displayed as a character ⟨c⟩ resulting from the character recognition process of the handwritten input strokes displayed in FIG. 5.A. The recognition process for handwriting input generally takes a probabilistic approach to interpreting hand-drawn strokes to find the most probable candidates for characters.

The recognition candidates are further processed by language expert 126 of the HWR system 114 for providing probabilities for recognition candidates. Conventional digital handwriting systems and methods using such probabilities generally provide the highest probability character and word candidates as recognized content, such that upon typesetting the recognized content is converted to the digital content at which time the recognized content, and as such the recognition result, is discarded The language model may be set up to the French language by the user or it may be used among other languages by the HWR system 114. More generally, the present invention may apply to any language.

In the present example, the best score candidate is selected as recognized typeset sequence by the computing device 100. Or else, the recognized typeset sequence may be selected by the user from a drop-down interactive menu among several candidates. The recognition expert 124 outputs a list of element candidates such as ("francais", "francous", "francars", francois") with recognition scores.

Similarly, the fourth sequence of typeset characters 514 "etre" is displayed with a character ⟨e⟩, as first character, and the fifth sequence of typeset characters 515 "accentue" is displayed with a base letter ⟨e⟩, as last character. Typeset character sequences result from the character recognition process of the handwritten input strokes displayed in FIG. 5.A.

As discussed earlier, from a linguistic perspective, the sequences 512, 514 and 515 "francais", "etre" and "accentue" of the typeset content 500 displayed in FIG. 5.B, each of these sequences includes an omission or a spelling error for being considered as three words of a grammatically correct phrase.

In another example, the typeset content 500 of FIG. 5.B. was input to the computing device 100 by typing using keyboard rather than by handwriting, the keyboard or typing decoder of the computing device, e.g., provided as an application in the memory, as part of the operation system, or in the present system and method as part of the ink management system. Similar management also applies if the typeset content 500 was input via other means, such as optical character recognition (OCR) from digital or non-digital (e.g., paper ink) handwriting. This digital content 500 is handled by the computing device 100 by treating each digital character as a digital object.

However, unlike the recognition process for handwriting input which generally takes a probabilistic approach to find the most probable candidates for characters, the decoding process for typed input as keystrokes on a keyboard are directly interpreted into 'digital objects' (e.g., the typed letter "a" as depicted in this text is a digital object).

FIG. 5.C shows, as displayed on the display 102 of the computing device 100, one input line as typeset content 500 distributed into five successive sequences of typeset characters (including sequences 522, 524 and 525) displayed as "Le francais peut etre accentue." together with three handwritten input strokes 22, 24 and 25 representing marks in the vicinity of the typeset characters. This typeset content is thus formed by a combination of mixed input type characters (of the typeset and handwritten types) correctly spelt in the French language.

As discussed earlier, from a linguistic perspective, considering the character sequences 522, 524 and 525 "francais", "etre" and "accentue" of the typeset content 500 displayed in FIG. 5.C, each of these sequences includes an omission or a spelling error for being considered as three words of a grammatically correct phrase. The handwritten input strokes are added content aimed at completing the initial glyph of typeset characters and typeset sequences into different final typeset glyphs and properly spelt words.

As shown in FIG. 5.C, a first handwritten input stroke 22 is displayed below of, roughly adjacent and centered to the fifth typeset character 〈c〉 of the sequence 522 "francais". The first handwritten input stroke 22 may represent a cedilla mark which would result in the display of a mixed input type character representing a combined 〈ç〉 allowing the display of the correctly spelt word "français".

Similarly, a second handwritten input stroke 24 is displayed roughly centered over the first typeset character 〈e〉 of the sequence 524 "etre". The second handwritten input stroke 24 may represent a circumflex accent 〈ˆ〉 which would result in the display of a mixed input type character representing an accentuated letter 〈ê〉 allowing the display of a correctly spelt word "être".

Similarly, a third handwritten input stroke 25 is displayed roughly centered over the last typeset character 〈e〉 of the sequence 525 "accentue". The third handwritten input stroke may represent an acute accent 〈´〉 which would result in the display of a mixed input type character representing an accentuated letter 〈é〉 allowing the display of a new grammatical form of the word "accentué".

FIG. 5.D shows, as displayed on the display 102 of the computing device 100, one input line as typeset content 530. The typeset content is distributed into five successive sequences of typeset characters displayed as "Le français peut être accentué." which represent together a correct sentence of five words in the French language. The typeset content is resulting from the recognition of the mixed input type characters of FIG. 5.C representing combined or accentuated characters as described earlier. The recognition process of the mixed input type characters is further described here below according to a particular embodiment of the present invention.

FIG. 6.A shows, as displayed on the display 102 of the computing device 100, four input lines as typeset content 600, according to another example. The typeset content 600 may have been introduced directly in typeset format (e.g. using a keyboard or a copy-paste function) or it may be the result of a conversion operation on a handwriting input. The first line represents six words ("Where do you take handwritten notes?") forming a questioning phrase in the English language, the second line includes a first ballot box 610 in form of a square ("☐") as a first character of the second line and two words ("at home") representing a first possible answer to the questioning phrase, the third line includes a second ballot box 620 as a first character of the third line and two words ("at work") representing a second possible answer to the questioning phrase and the fourth line includes a third ballot box 630 as a first character and two words ("at school") representing possible answer to the questioning phrase. The four input lines represent together a questionnaire wherein a user can answer a question by checking or not one or more ballot boxes. A ballot box may indicate a binary choice displayed in a caption adjacent to the ballot box. A ballot box may take other appropriate form, for example round shape, depending on each case.

FIG. 6.B shows, on the display 102 of the computing device 100, the four input lines as typeset content 600 of FIG. 6.A. Two handwritten input strokes 10 and 30 are displayed approximately within the first and the third ballot boxes of the second and fourth input lines.

The first handwritten input stroke 10 displayed on the first ballot box 610 represents an additional character as a first tick-mark (" ") approximately centered and entered across the first ballot box 610 displaying a first mixed input character.

The second handwritten input strokes 30 displayed on the third ballot box 630 represents a second additional character as a x-mark approximately centered and entered across the third ballot box 30 displaying a second mixed input character.

An initial character formed by a typeset ballot box completed with an additional handwritten character such as a tick-mark or an x-mark is therefore indicating a completion or an approval of a binary choice corresponding to the caption directly following the ballot box.

The displayed first and third typeset ballot boxes 610 and 630 completed with the first and second input strokes 10 and 30 are representing ballot boxes checked with marks for approving the corresponding answer or proposal.

FIG. 6.C shows, as displayed on the display 102 of the computing device 100, four input lines as typeset content 650 of the FIG. 6.B. These four input lines include merged characters representing checked ballot boxes containing a tick-mark 660 on the second line and a x-mark 680 on the fourth line. Those typeset characters 660 and 680 are resulting from the handwritten recognition of the first mixed input character 610 and 10 and second mixed input character 630 and 30 of FIG. 6.B. The recognition process of the mixed input characters is further described below.

The computing device 100 processes the content of FIG. 5.C by segmenting the typeset content to determine the relative position of the three handwritten input strokes relative to the typeset characters.

The segmentation is performed by the HWR system 114 during the recognition process. This segmentation information is retrieved by the application 112 to determine the ranges of each typeset characters. As discussed earlier, in the recognition process the input strokes are segmented to determine probable character candidates. A similar (or the same or actual) segmentation approach is taken by the present computing device 100 and associated methods to recognize the mixed input character. For example, the segmentation may be performed using EP1836651B1.

FIG. 7.A shows the determined ranges, illustrated as character segmentation boxes 701 to 731 as an example segmentation of the characters of the typeset sequence "Le francais peut etre accentue". The segmentation is illustrated by a series of boxes 701 to 731 designating the typeset character bounds or extent. Each typeset character is thus contained in a dedicated segmentation box. This segmentation leads to consider each typeset character as a segmented character. FIG. 7.A shows the typeset content with a representation of a segmentation of the typeset sequence 500 "Le francais peut etre accentue" and the three handwritten input strokes 22, 24 and 25.

In FIG. 7.B, each handwritten input stroke representing a mark is included into at least one segmentation box of a typeset character. A segmentation box defines borders within which should be located, at least part of the handwritten input stroke, to be considered as related to the typeset character.

The first handwritten input stroke 22 is included within the seven's segmentation box 707 delimiting the geometric area of the typeset character 'c'.

The second handwritten input stroke 24 is mainly included within the fifteen's segmentation box 715 delimiting the geometric area of the character 'e'. The second handwritten input stroke 24 is slightly touching the left boundary of the following segmentation box 716, therefore the computing device considers the second handwritten input stroke 24 as being included into the segmentation box 716 delimiting the geometric area of the character the character 't'.

The third handwritten input stroke 25 is mainly included within the twenty-sixths segmentation box 726 delimiting the geometric area of the character 'e' and is overlapping the right border of the segmentation box 725, it is therefore partially included into the twenty-fifths segmentation box 725 delimiting the character 'u'.

During or after the segmentation step, the computing device 100 detects each handwritten input stroke which is positioned in the vicinity of a typeset character, that is, which is included in the geometric area (i.e. within the segmentation box) of a segmented character. Each segmented character identified as having a handwritten stroke present in their segmentation box is then further processed by checking if it is part of a predefined list PDL of base characters, where each base character is capable of forming a different character, that is a combined character, an accentuated letter or a merged character, when completed with an additional mark (or additional symbol), such as an accent, a diacritical mark or any suitable additional character, to form a combined character such as an accentuated letter or a merged character representing a different grapheme or symbolic meaning. The predefined list of base characters may be predefined in the content of linguistic information 130 (as shown in FIG. 3). In this example, the predefined list is stored in the memory 108 of the computing device 100, although it may be stored in any suitable accessible memory, such as in a memory internal to the computing device 100 or in an external memory remotely accessible by the computing device 100.

In the present document, a segmented character which is detected as matching with a base character from the predefined list (identified as a base character), i.e. a predefined typeset character is capable of being completed by at least one additional mark as explained earlier.

For example on FIG. 7.B, the first input stroke 22 is included (or positioned) in the geometric area of the segmented character 'c' 707. Since the character 'c' has been predefined as a base character in the stored list of based characters in the linguistic information 130, the first input stroke is processed in combination with the segmented character "c" 708 for further recognition, as described below.

The second input stroke 24 is included in the geometric areas of the segmented character 'e' 715 and the segmented character 't' 716.

Since a character 'e' combined with diacritics acute, circumflex, grave, dieresis generates an accentuated letter "e" such as 'é', 'ê', 'è', 'ë', the character "e" has been predefined as a base character in the stored list of based characters in the linguistic information 130. Therefore, the second input stroke 24 is processed in combination with the segmented character "e" 715 identified as typeset characters for further recognition, as described below.

The character 't' is not listed as possible base character in the stored list of based characters of the linguistic information 130. Indeed, no combined character, accentuated letter or merged character is formed from a character "t" in the French language. Therefore, the segmented character 't' 716 is not considered for further recognition of the second input stroke.

The empty space existing before the geometric area 715 allows the second handwritten input stroke 24 to be considered as a character apostrophe ''' which is integrated as a regular handwritten input character in an empty space and recognized as a standard character candidate.

The third input stroke 25 is included in the geometric area of the segmented character 'u' 725 and the segmented character 'e' 726. The character 'u' is listed, as a base character, in the stored list of based characters in the linguistic information 130. Indeed, a character 'u' combined with a grave accent generates an accentuated letter 'ù'. Similarly, as previously described thereover, the character 'e' is also a predefined base character according to the predefined list of based characters. Therefore, the third input stroke is processed in combination with the segmented character 'u' 725 and the segmented character 'e' 726 identified as typeset characters for further recognition as described below.

In other words, the computing device 100 identifies, based on the predefined list PDL of base characters, the segmented character 'c' 707, the segmented character 'e' 715, the segmented character 'u' 725 and the segmented character 'e' 726 as "first typeset characters" that are capable of being completed with at least one additional mark (or additional symbol).

In FIG. 7.C, the identified first typeset characters from FIG. 7.B are further processed by replacing the typeset version of these characters by a predefined character version 757, 765, 775 and 776 of these characters to generate a hybrid character. Predefined versions of base characters are stored, as pre-stored data, and retrieved from any suitable memory, such as a memory internal to the computing device 100 (memory 108) or from an external memory remotely accessible by the computing device 100. In one example, the predefined character version of each identified first typeset character is stored, as pre-stored data, as an existing prototype in an internal or external memory.

A prototype in the present document designates a predefined character version of base characters stored as pre-stored data PSD. Predefined character versions of base characters are stored as prototypes. According to one embodiment of the present invention, prototypes are typeset character versions which have been tested and recognized by the handwriting recognition expert 124, such as certain character font versions. According to another embodiment, prototypes are handwritten character versions which have been tested and recognized by the handwriting recognition expert 124. Prototypes are predefined representations of a character unambiguously recognized by the recognition expert 124 as the unique character encoding reference of a standard character repertoire of a character encoding system such as Unicode.

In another example, the predefined character version of each identified first typeset character is stored as a handwritten character extracted from the handwritten input line initially acquired by the computing device 100 as shown in FIG. 5.A.

FIG. 7.D shows the typeset sequences of FIG. 7.A wherein the identified first typeset characters have been replaced, by the computing device 100, with the corresponding predefined characters 757, 765, 775 and 776 (i.e. the predefined character versions) retrieved from the pre-stored data.

The computing device 100 thus combines the handwritten input strokes with the predefined characters retrieved from the pre-stored data to generate hybrid characters to be recognized. For instance, the computing device 100 generate a hybrid character corresponding to the letter "ç" by combining the first typeset character "c" identified in the segmentation box 708 and the handwritten stroke below representing a cedilla mark, and so on for the two other identified first typeset characters.

The HWR system 114 (FIG. 1) then provides probable character candidates with associated probabilities of recognition for each hybrid character generated by the computing device 100, as illustrated in FIG. 7.E, FIG. 7.F, FIG. 7.G. The generation of those candidates leads to the recognition of the hybrid characters into existing combined characters such as accentuated letters according to the HWR system and methods described earlier.

The computing device 100 processes the content of FIG. 6.B in an analogous manner by segmenting the typeset content to determine the relative position of the two handwritten input strokes relative to the typeset characters.

FIG. 8.A shows the typeset content of the three lines representing the possible answers to the questioning phrase of the questionnaire of FIG. 6.A and the two handwritten input representing the tick-mark and the x-mark over the first and third ballot-boxes, additionally a virtual representation of a segmentation of each character of the three lines is aimed at illustrating the recognition process of the handwritten input as further explained below. The segmentation is illustrated on the figure by a series of boxes 801 to 829 designating the typeset character bounds or extent defined as the geometric area of the considered character. This segmentation allows to consider each typeset character as a segmented character.

In FIG. 8.B, the first handwritten input 10, representing a tick-mark, is mainly included (positioned) within the segmentation box 801 delimiting the geometric area of first ballot box ("□"), it is overlapping the right border of the segmentation box 802, and therefore partially included into the following segmentation box 802 delimiting the geometric area of a character 'a'.

The second handwritten input representing a x-mark is included within the segmentation box 821 delimiting the geometric area of third ballot box ("□").

Each handwritten input represents the input of an additional mark (or additional symbol), in order to indicate the answers to the questioning phrase not shown.

During or after the segmentation step, the computer device 100 detects each handwritten input stroke which is positioned in the vicinity of a typeset character, that is, which is included in the geometric area (i.e. within the segmentation box) of a segmented character. If a handwritten input stroke is detected within the geometric area of a segmented character, this segmented character is therefore identified as potential base character and further tested as indicated below.

More specifically, each identified character is then further processed by checking if it is part of a list of base characters (as described earlier with reference to FIG. 5.A-5.D), where each base character is capable of forming a different character, that is a combined character, an accentuated letter or a merged character when completed with an additional mark (or additional symbol), such as an accent, a diacritical mark or any suitable additional character, to form a combined character such as an accentuated letter or a merged character representing a different grapheme or symbolic meaning. The predefined list of base characters may be predefined in the content of linguistic information 130 (as shown in FIG. 3). In this example, the predefined list is stored in the memory 108 of the computing device 100, although it may be stored in any suitable accessible memory, such as in a memory internal to the computing device 100 or in an external memory remotely accessible by the computing device 100.

As already indicated, in the present document, a segmented character which is detected as matching with a base character from the predefined list is identified as an "first typeset character", i.e. a predefined typeset character that is capable of being completed by at least one additional mark (or or additional symbol) as explained earlier.

For example, the typeset ballot box ("□") is a possible base character identified as such in the predefined list of base characters. Indeed, a character ballot-box can be combined with an additional character tick-mark (" ") or an additional character x ("x") to form a ticked-box ("☑ ") or a checked-box ("☒ ") having a different symbolic meaning of approving a following caption.

The typeset character 'a' is a possible base character from the list of base characters stored in the content of the linguistic information 130, because, an input overlapping the geometric area of a character 'a' could be accentuated as an 'à'.

The number and nature of the base characters contained in the predefined list may vary depending on each case. The predefined list may identify one or a plurality of such base characters.

As shown in FIG. 8.B, the computing device 100 may detect the first handwritten input 10 representing a handwritten tick-mark as being included in the geometric area of a ballot box ("□") 801 which is a base character according to the predefined list of base characters.

Consequently, the first handwritten input is processed by the computing device 100 in combination with the identified ballot box for further recognition.

Additionally, the first handwritten input is partially included into the geometric area of a character 'a' 802, which is a possible base character, consequently the first handwritten input is processed by the computing device 100 in combination with the identified character 'a' for further recognition.

The second handwritten input, representing a handwritten x-mark, is included in the geometric area of a ballot box ("□") 821. The ballot box is a base character according to the predefined list of base characters. Consequently, the input stroke is processed by the computing device 100 in combination with the identified ballot box for further recognition.

The three identified characters 801, 802 and 821 are further processed by considering (or associating) the corresponding handwritten input with the typeset characters identified as base characters to generate mixed input characters and submitting the mixed input characters to the HWR system 114 for recognition. Each combination of a typeset character identified as a base character with a corresponding additional handwritten mark forms a mixed input character to be recognized.

The HWR system 114 provides probable character candidates, as illustrated in FIG. 8.C and FIG. 8.D, based on text recognition performed on each identified mixed input character (as discussed above). The generation of those candidates leads to the recognition of the mixed input characters into existing merged characters (i.e. hybrid characters) according to the HWR system 114 and methods described earlier. FIG. 8.C shows a first ticked box as a first recognized character candidate of the mixed input character composed by the typeset first ballot box combined with the first handwritten tick-mark. Alternatively, FIG. 8.D shows an accentuated character 'a' as a first recognized character candidate of the mixed input character composed by the typeset character 'a' combined with the first handwritten tick mark which is therefore interpreted and recognized as a grave accent.

Figure 9:
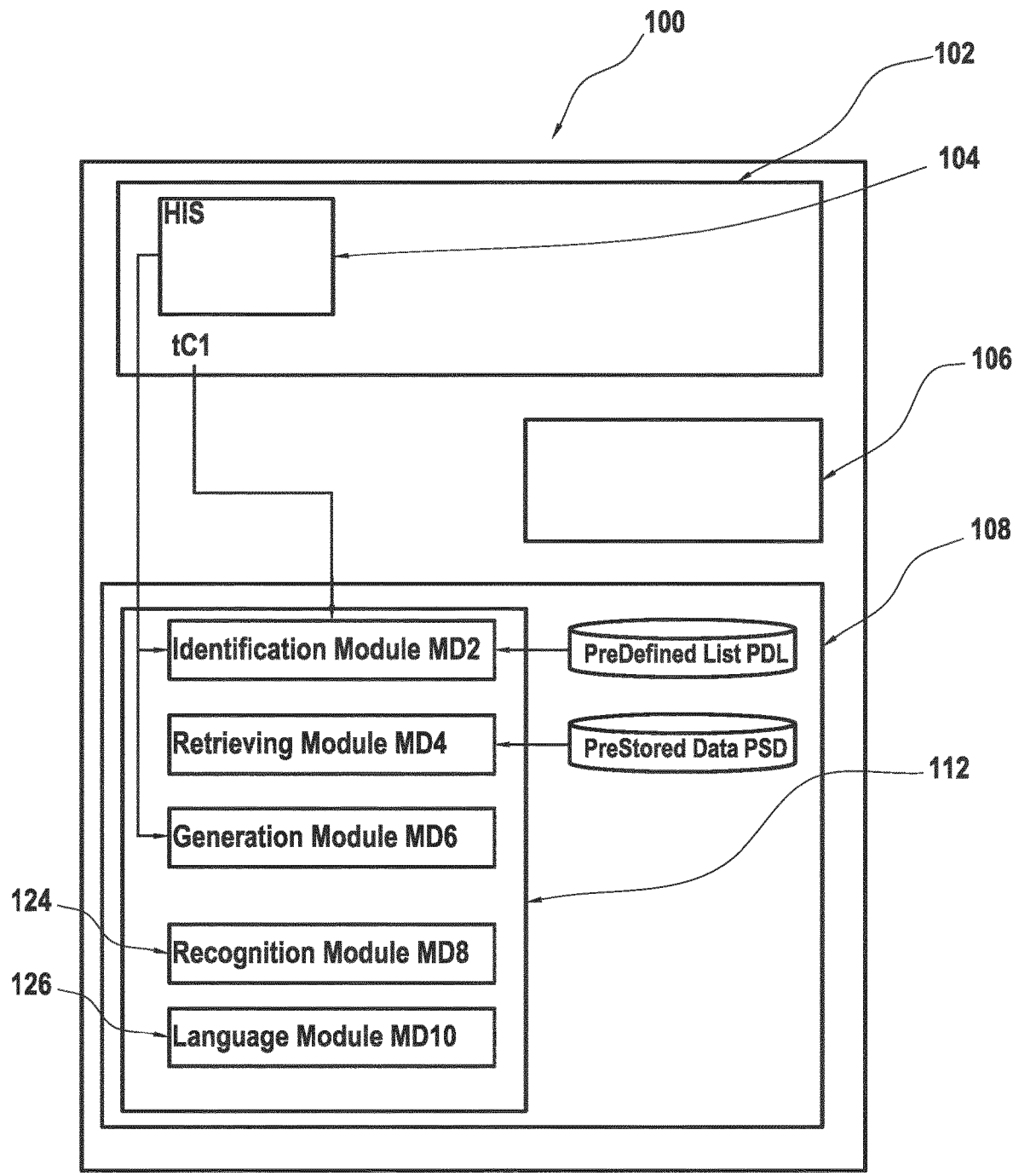
FIG. 9 show is a block diagram representing schematically modules implemented by the computing device of FIG. 1, according to a particular embodiment of the invention.

As shown in FIG. 9 according to a particular embodiment, when running the HWR system 114 stored in the memory 108 (FIG. 1), the processor 106 may implement software or hardware modules, namely: an identification module or typeset identifier MD2, a retrieving module or data retriever MD4, a generation module or hybrid generator MD6, a recognition module MD8 (which in the present example is the recognition expert 124 shown in FIG. 3) and a language module MD10 (which in the present example is the language expert 126 shown in FIG. 3).

The identification module or typeset identifier MD2 is configured to identify the first typeset character tC1 as a base character capable of character completion for creating a different character such as an accentuated letter or a combined character as described thereover. The base characters are listed in a predefined list PDL of base characters in the content of linguistic information 130. In this example, the predefined list is stored in the memory 108 of the computing device 100, although it may be stored in any suitable accessible memory. Therefore, if the first typeset character tC1 belongs to the predefined list PDL of base characters, an instance of the first typeset character is parsed to the retrieving module MD4.

The retrieving module or data retriever MD4 is configured to provide a predefined character version pC1 of the first typeset character tC1. Predefined character versions are stored from prestored data PSD of base characters. Predefined character versions of base characters are stored as prototypes. According to one embodiment of the present invention, prototypes are typeset character versions which have been preliminary tested and successfully recognized by the handwriting recognition expert 124, such as certain character font versions and therefore stored as prestored data PSD. According to another embodiment, prototypes are handwritten character versions which have been preliminary tested and successfully recognized by the handwriting recognition expert 124, and therefore stored as prestored data PSD.

Thereafter, the retrieved predefined character version pC1 of the first typeset character tC1 is available to the generation module MD6.

The generation module or hybrid generator MD6 is configured to generate a hybrid character HC by replacing the first typeset character tC1 by the predefined character version pC1 of the first typeset character tC1 combined with the handwritten input stroke HS detected in the vicinity of the first typeset character tC1. According to one embodiment of the present invention, the predefined character pC1 is replacing the first typeset character tC1 according to geometrical constraints. For example, geometrical constraints could be based on the common geometrical features of the first typeset character tC1 and the predefined character pC1 themselves (e.g., the barycenter) or common or non-common geometrical features of such elements (e.g., edges of the segmentation boxes, center-point of the y-direction extents of each segmentation box, or different edges of the elements themselves).

For example on FIG. 7.B, the center of geometry of segmentation boxes 707, 715, 725 and 726, are determined by the computing device 100. As shown on FIG. 7.C, when predefined characters pC1 are replacing the first typeset characters tC1, the center of geometry of the segmentation boxes 757, 765, 775 and 776 are determined by the computing device 100 and are adjusted to remain at the same centers of geometry as boxes 707, 715, 725 and 726 of FIG. 7.B.

According to another embodiment of the present invention, the predefined character pC1 is positioned together with the handwritten input stroke HS according to geometrical constraints. For example, geometrical constraints could be based on the common geometrical features of the handwritten input stroke HS and the predefined character pC1 (e.g., the barycenter) or common or non-common geometrical features of such elements (e.g., edges of the segmentation boxes, center-point of the y-direction extents of each segmentation box, or different edges of the elements themselves). This feature may correct or optimize the recognition stage of the hybrid character HC in case the handwritten input stroke HS may not be optimally positioned over or that the user may have unintentionally offset from the targeted first typeset character tC1.

In another embodiment, the hybrid character HC is generated by keeping the first typeset character pC1 combined the handwritten input stroke (as described in FIG. 8.B). In this example, the hybrid character is a mixed input type character because it combines the first typeset character with the handwritten input stroke as additional mark.

The generated hybrid character HC is then transmitted to the recognition module MD8 (in this example, to the HWR system 114) for handwriting recognition of the hybrid character HC. The recognition module MD8 is configured to generate a list of character candidates with associated probabilities of recognition of the hybrid character HC. Probability score may be calculated such that only hypotheses with a sufficiently high score are retained.

The generated list of character candidates is parsed to the language module MD10 (in this example through the language model employed by the language expert 126 the HWR system 114). The language module is configured to recognize the combined character C2 intended by the user in replacement of the first typeset character tC1. The HWR system 114 returns a new recognition result to the document management system 112. The language expert 126 may then generate linguistic meaning for the different character candidates according to linguistic information 130.

Figure 10:
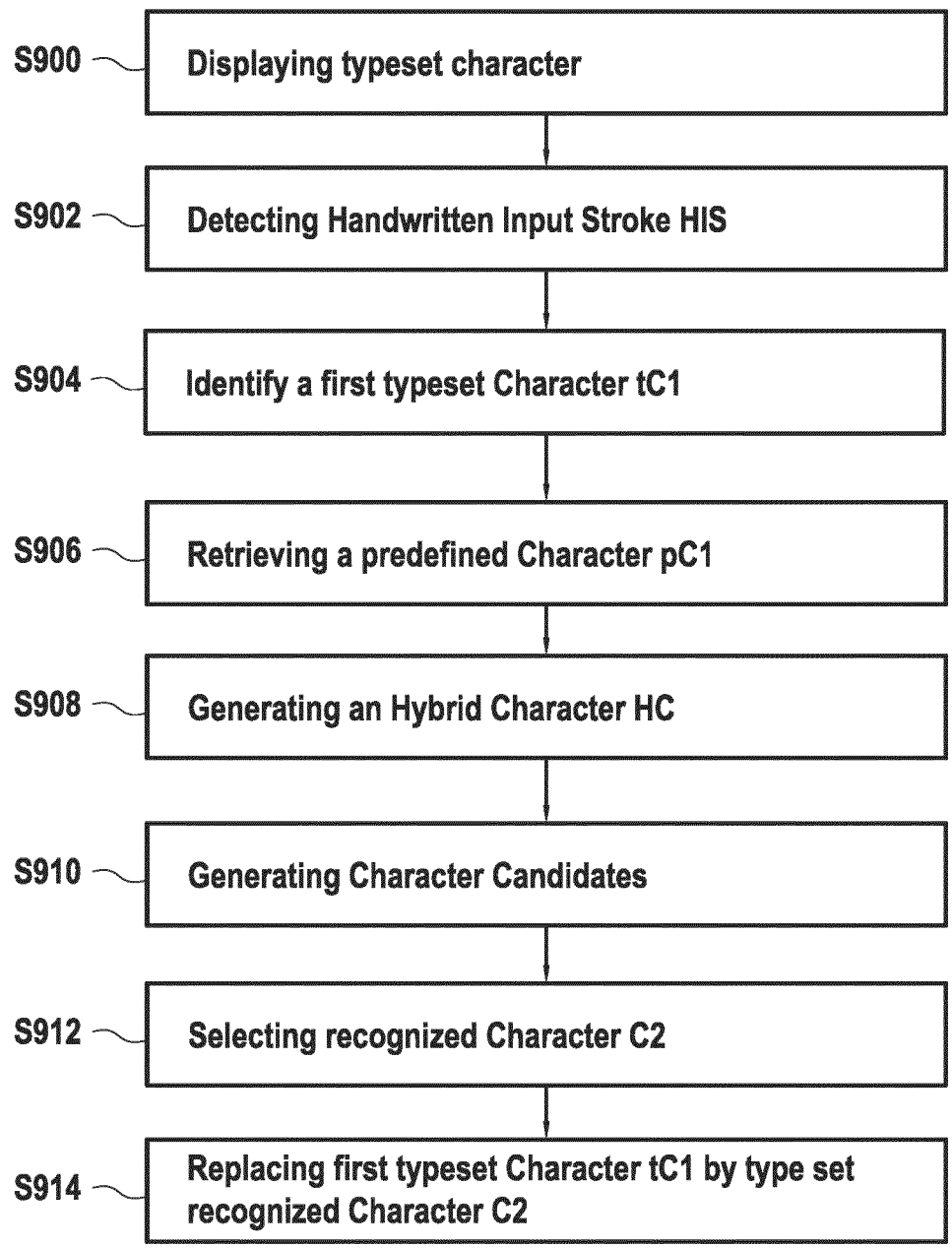
FIG. 10 shows a flow diagram of an example of the present method for completing a character of a text of a digital document on a computing device.

A method implemented by the computing device 100 (as described earlier with reference notably to FIG. 1-8) for performing character completion is now described with reference to FIG. 10, in accordance with a particular embodiment of the present invention. More specifically, the computing device 100 implements this method by executing the HWR system 114 stored in the memory 108.

An example scenario is considered where the computing device 100 has previously acquired by any suitable manner a digital document that contains at least one typeset character in digital ink form. In the present example, it is assumed that this digital document includes a plurality of typeset characters, although other embodiments are possible where only one typeset character is present in the digital document.

In a displaying step S900, the computing device 100 displays the text of the digital document on the display interface 102 so that at least one typeset character of the text can be visualized by a user.

In a detecting step S902, the computing device 100 detects at least one handwritten input stroke HIS on the digital document. The handwritten input stroke HIS may be drawn by a user using the input surface 104 or may be acquired by any other suitable means. In the present embodiment, the computing device 100 detects the handwritten input stroke HIS in the vicinity of at least one first typeset character tC1. In the present example, the vicinity of a typeset character is defined within the extend or boundaries of the typeset character and outlines a geometric area of the typeset character. The way it is determined whether a handwritten input stroke is or is not positioned in the vicinity of a typeset character may be adapted by the skilled person depending on each case.

In one example, a geometric area of a typeset character is set at a predefined distance from a geometric center of the typeset character. In another example, a segmentation approach is taken to define a geometric area of the typeset character, similar or identical to the segmentation used by the recognition process discussed earlier. This segmentation involves segmenting each typeset character of the text of the digital document and creating dedicated segmentation boxes enclosing separately each typeset character (as shown for instance in FIGS. 7.A and 8.A).

In step S904, the handwritten input stroke HIS is detected in the vicinity of at least one typeset character if at least one portion of the handwritten input stroke HIS is located within the geometric area of the at least one typeset character. The geometric areas of the typeset characters including the portions of the handwritten input stroke allows to identify at least one first typeset character tC1 that may or may not be capable of character completion (i.e. of being completed by an additional mark).

In a further step S906, the computing device 100 checks if the first typeset character tC1 belongs to the predefined list PDL of base characters in the linguistic information 130 stored in the memory 108. If yes, the computing device 100 identifies the first typeset character tC1 as an first typeset character capable of character completion (i.e. capable of being completed by at least one additional mark). Otherwise, it means that no character completion can be achieved for this first typeset character tC1.

Checking at this early stage that the first typeset character tC1 is actually capable of being completed with an additional character allows avoiding waste of resources in terms of data processing. If the computing device 100 determines that the first typeset character tC1 is not part of the list PDL (and thus is not a base character capable of undergoing character completion), then the present method can end, i.e. the forthcoming steps S906-S914 do not need to be performed to avoid embarking into unnecessary data processing. As indicated earlier, an additional mark (or additional symbol) within the meaning of the present invention should be understood broadly to encompass any suitable accents, diacritical marks, but also any additional characters (e.g., the character "e" can be considered in French as an additional mark for the character "o" so as to form in combination the French character "œ").

In the present example, the predefined list of base characters includes characters, known from each language alphabet (or at least from one language alphabet), which can be combined with one or more additional marks or additional symbols (such as accents, diacritical marks, characters, etc.) to form a different character, such as an accentuated letter or a merged character, creating a distinct second character such as a different grapheme or a different symbol.

If it is detected in S904 that the first typeset character tC1 is an item of the predefined list of base characters, the computing device 100 retrieves (S906), from pre-stored data PSD (stored for instance in the memory 108), a predefined character pC1 (or predefined character version) which is a different version of the first typeset character tC1.

In this example, the pre-stored data is stored in the memory 108, although it may be stored in any suitable memory accessible to the computing device 100. The pre-stored data may comprise one or a plurality of predefined characters (or predefined character versions) in association with a respective base character. In the present example, the pre-stored data defines a predefined character for each base character of the predefined list of base characters.

The predefined characters (or predefined character versions) stored in the pre-stored data are prototypes such as for example handwritten versions of typeset characters or different typeset font versions of unique encoded characters as described previously. In one example, the handwritten versions of typeset characters are samples preliminary set in the memory 108 of the computing device 100 as prototypes (as previously described). In another example, the handwritten versions of the typeset characters are retrieved from the memory 114 as handwritten input text detected, recognized and stored by the ink management system 112 as handwritten input for later use.

Then in step S908, the computing device 100 generates a hybrid character HC by combining the predefined character pC1 with the handwritten input stroke HIS. In other words, the hybrid character HC is generated by replacing the identified first typeset character tC1 by the predefined first character pC1. The hybrid character HC is thus formed by a combination of the predefined character version pC1 and the handwritten input stroke HIS.

As indicated earlier, the predefined character pC1 (or predefined character version) is a different version of the version of the first typeset character tC1 that was initially displayed in the displaying step S900. Replacing the first typeset character tC1 in the hybrid character HC with the different character pC1 allows the forthcoming character recognition in step S910 to be more efficient. As a replacement of the first typeset character tC1, the computing device 100 can select a predefined character pC1 (e.g., a prototype) which is more appropriate or easier to process in association with a handwritten stroke (i.e. the handwritten input stroke HIS in this case). The predefined character pC1 may for instance be a handwritten version of the predefined character pC1 which allows, in association with the handwritten input stroke HIS, a more efficient handwriting recognition during the forthcoming step S910. In other instances, the predefined character pC1 may be another typeset version which is more suited for handwriting recognition (or character recognition) in association with the handwritten input stroke HIS. Performing a character recognition on the hybrid character allows for a better recognition of the combined character because the combination of the hybrid character with the added handwritten input stroke (e.g. a diacritic) is a closer approximation of a handwritten version of the combined character and, therefore, the features analyzed by the recognizer are not dependent on features of the typeset character.

Thus, the analyzer, trained to recognize handwritten characters, will perform better because the hybrid character will comprise handwriting characteristics and features for both parts (the predefined character PC1 and the handwritten input stroke) and therefore handwriting recognition will run unbiased by the features of the typeset portion of the hybrid character if the typeset character was not replaced.

In one example, the center of geometry of the handwritten predefined character pC1 is placed by the computing device 100 on the center of geometry of the first typeset character tC1. In another example, the center of geometry of the handwritten predefined character pC1 is aligned with a center of geometry of the handwritten input stroke HIS.

In step S910, the hybrid character HC is sent to the handwriting recognition system 114 and its recognition expert 124. The recognition expert 124 processes the hybrid character HC, i.e. performs character recognition or handwriting recognition on the hybrid character HC, to output a list of character candidates with associated probabilities of recognition. In a selection step S912, the HWR system 114 provides recognized results, i.e. a recognized combined character C2, based on a highest probability score among the candidate characters of the list determined in S910. More particularly, the computing device 100 selects a recognized combined character C2 from the character candidate list based on the associated probabilities. The character candidate of the list which has the highest probability score is selected in S912. This recognized character is recognized by the computing device 100 as a new character C2, i.e. a new recognized character resulting from the combination of the combination of the typeset initial character tC1 together with the handwritten input stroke HIS.

In another embodiment, the detected handwritten input stroke (HIS) is in the vicinity of at least two first typeset characters, whereby the generation module generates at least two hybrid characters (HC) by replacing the at least two first typeset characters (tC1) by their respective predefined character versions; and, the recognition module performs character recognition on the at least two hybrid characters (HC) to generate for each hybrid character respective lists of character candidates with associated probabilities of recognition of the hybrid characters (HC).

Indeed, the handwritten input stroke HIS may be detected in more than one geometric areas of neighboring characters of the text, allowing the one handwritten input stroke to be taken into account in association with the detected neighboring characters of the text. Further, multiple hybrid characters HC arising from the handwritten input stroke HIS and the detected neighboring characters are sent to the handwriting recognition system 114 and its recognition expert 124 in the recognition step to recognize the most probable intended completed character, as further explained in step S910.

For example, in the French language, when an acute accent is handwritten over two neighboring base characters 'e', the handwritten input stroke HIS may be located within the geometric area of both base letter 'e' and lead to the recognition of "ee" or "ée" or "e'e" or "eé". The actual recognition will be solved by considering the geometric areas but also the linguistic context, as further explained in step 912.

The recognition expert 124 may process multiple hybrid characters HC arising from the same handwritten input stroke HIS, when it is detected in more than one geometric areas of neighboring characters of the text. The character recognition or handwriting recognition performs recognition on multiple hybrid characters, to output respective lists of recognition candidates with associated probabilities of recognition. The lists of recognition candidates for the handwritten input strokes include recognition candidates from more than one character positions of text if the one handwritten input stroke is associated with neighboring characters of the text. In this latter case, the recognition is performed by selecting the highest probability among candidates of multiple characters of the text therefore considering linguistic context of the overall typeset text.

In step 914, the identified first character is replaced by the recognized combined character.

The present invention allows the user to complete an additional mark (i.e. an accent or the like) on a typeset character in an ergonomic and efficient manner, whereas conventional handwriting recognition applications are limited to only certain operations involving complex or unnatural manipulations by the users, such as erasing through keyboard input or erasing gesture for re-inputting the entire combined character. As such, the manner of interaction with the content is easy to use, intuitive and non-disruptive to the input of the content itself.

In particular, the present invention provides an efficient technique for processing and recognizing a typeset character which is being completed with a handwritten character (or handwritten symbol), while limiting the resources required in terms of data processing.

While not explicitly described, the present embodiments may be employed in any combination or sub-combination thereof.

This disclosure having been described in particular embodiments, it is clear that it is susceptible to numerous modifications and embodiments within the ability of those skilled in the art and without the exercise of the inventive faculty. Accordingly, the scope of the invention is defined by the scope of the following claims.

The invention claimed is:

1. A computing device for performing character completion in a text of a digital document, comprising:
    a display interface configured to display at least one typeset character of the text;
    an input surface configured to detect a handwritten input stroke input on the digital document, in the vicinity of a first typeset character of said at least one typeset character;
    an identification module configured to check whether the first typeset character is part of a predefined list of base characters according to a language model, and configured to identify the first typeset character as a base character capable of character completion if the first typeset character belongs to the predefined list;
    a retrieving module configured to retrieve from pre-stored data, from a first memory, a predefined character version of the first typeset character different from the first typeset character;

a generation module configured to generate a hybrid character by replacing the first typeset character by the predefined character version, said hybrid character being formed by a combination of the predefined character version and the handwritten input stroke;

a recognition module configured to perform a character recognition on the hybrid character to generate a list of at least one character candidate with associated probabilities of recognition of the hybrid character; and a language module configured to select a recognized combined character from the character candidate list based on the associated probabilities.

2. The computing device of claim 1, wherein the detected handwritten input stroke is at least partially located within predefined boundaries of the first typeset character.

3. The computing device of claim 1, wherein the detected handwritten input stroke is in the vicinity of at least two first typeset characters, whereby the generation module generates at least two hybrid characters by replacing the at least two first typeset characters by their respective predefined character versions; and, the recognition module performs character recognition on the at least two hybrid characters to generate for each hybrid character respective lists of character candidates with associated probabilities of recognition of the hybrid characters.

4. The computing device of claim 1, wherein the predefined list of base characters defines, in the first memory, characters which are combined with at least one additional mark or character to form a combined character.

5. The computing device of claim 3, wherein the additional mark is a diacritical mark and the combined characters are accentuated letters.

6. The computing device of claim 1, wherein the computing device is configured to:

cause display of a handwritten input text on the display interface of the computing device;

store the handwritten input text in a second memory of the computing device;

cause recognition of the handwritten input text to determine the at least one first typeset character;

wherein the predefined character version retrieved from the pre-stored data is a handwritten character of the handwritten input text.

7. The computing device of claim 1, wherein the predefined character version retrieved from the pre-stored data is stored as a prototype.

8. The computing device of claim 6, wherein the prototype is a handwritten character.

9. The computing device of claim 1, wherein the hybrid character is generated in step 1.e) by positioning the predefined character together with the handwritten input stroke according to geometrical constraints.

10. The computing device of claim 1, wherein the hybrid character is generated by positioning a predefined character boundary adjacent to a handwritten input stroke boundary.

11. The computing device of claim 1, wherein the computing device is configured to cause display of the recognized hybrid character by replacing the first typeset character by the typeset recognized character.

12. A method, performed by a computing device, for character completion in a text of a digital document, said method comprising the steps of:

causing display of, on a display interface of the computing device, at least one typeset character of the text;

detecting, on an input surface of the computing device, a handwritten input stroke on the digital document, in the vicinity of a first typeset character of said at least one typeset character;

checking whether the first typeset character is part of a predefined list of base characters according to a language model and identifying the first typeset character as a base character capable of character completion if the first typeset character belongs to the predefined list;

retrieving, from pre-stored data, from a first memory, a predefined character version of the first typeset character different from the first typeset character;

generating a hybrid character by replacing the first typeset character by the predefined character version, said hybrid character being formed by a combination of the predefined character version and the handwritten input stroke;

generating a list of at least one character candidate with associated probabilities of recognition of the hybrid character, by performing a character recognition on the hybrid character; and selecting a recognized combined character from the character candidate based on the associated probabilities.

13. The method of claim 11, wherein the predefined list of base characters defines, in the first memory, characters which are combined with at least one additional mark or character to form a combined character.

14. The method of claim 11, further comprising:

causing display of a handwritten input text on the display interface of the computing device;

storing the handwritten input text in a second memory of the computing device;

causing recognition of the handwritten input text including the at least one first typeset character;

wherein the predefined character version retrieved from the pre-stored data is a handwritten character of the handwritten input text.

15. The method of claim 11, wherein the hybrid character is generated by positioning the predefined character together with the handwritten input stroke according to geometrical constraints.

16. A computer program including instructions for executing the steps of a method for character completion according to claim 11 when said program is executed by a computer.

* * * * *